CRYOTRON

Filed Nov. 5, 1963 2 Sheets-Sheet 1

INVENTOR.
CHARLES M. WINE
BY
[signature]
Attorney

INVENTOR.
CHARLES M. WINE
BY
Attorney 3,249,768
Patented May 3, 1966

3,249,768

CRYOTRON

Charles M. Wine, Princeton, N.J., assignor to Radio Corporation of America, a corporation of Delaware Filed Nov. 5, 1963, Ser. No. 321,580
4 Claims. (Cl. 307—88.5)

This invention relates to an improved relatively high speed cryoelectric switching circuit which is useful, for example, for driving a resistive load.

The circuit of the invention includes a gate electrode and a control electrode. In one condition of the circuit, both electrodes are superconducting and the gate electrode exhibits zero resistance and very low inductance. In the other condition of the circuit, both the gate electrode and the control electrode are driven out of the superconducting state. This causes the gate electrode to exhibit both a relatively high inductance and a finite value of resistance.

The invention is discussed in greater detail below and is shown in the following drawings of which:

In the discussion below, a low temperature environment, at which superconductivity is possible, is assumed.

A well-known cryoelectric switching element, the cryotron, includes a gate electrode and a control electrode. The gate electrode is formed of a "soft" superconductor such as tin and the control electrode is formed of a "hard" superconductor such as lead. As used here, the term "soft" refers to a superconductor which switches from its superconducting to its normal state at a relatively low temperature (and magnetic field) and the term "hard" refers to a superconductor which switches between these states at a relatively high value of temperature (and magnetic field). In the absence of a current applied to the control electrode, the gate electrode exhibits zero resistance. However, when a control current of greater than a given magnitude is applied to the control electrode, the gate electrode assumes a finite value of resistance.

Cryotrons have been used in current steering applications as, for example, in switching trees. In such trees there are a plurality of paths from a current source to respective loads and each path includes the gate electrode of a cryotron. If control current is applied to the control electrodes in all of the paths except one, then the gate electrodes in all of the paths switch to the normal, that is, the resistive, state. The remaining path remains superconductive and therefore substantially all of the current from the current source steers into this path.

Figure 2:
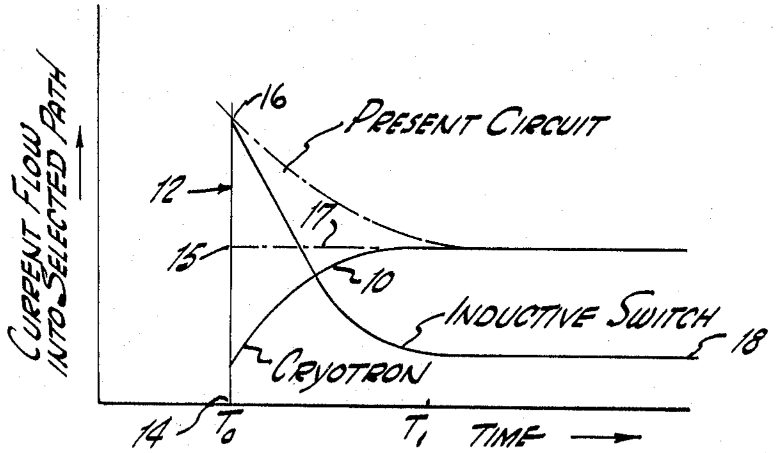
FIG. 2 is a graph of current versus time to help explain the operation of the circuit of FIG. 1.

In switching circuits of the type discussed above, it is desirable that the response time be very rapid. However, due to the time constant associated with each cryotron, there is a limit to the operating speed which is possible. This can be explained in a qualitative way by considering each path to have an inductance associated with it. If, for example, there are $n$ similar paths, one of which is selected, the current which is to be steered initially sees $n$ equal values of inductance. Accordingly, the current initially divides so that $1/n^{\text{th}}$ of the current appears in each path. Thereafter, the current applied to the non-selected paths decays and steers instead to the selected superconducting path. The current flow into the selected path is illustrated, in somewhat idealized form, at 10 in FIG. 2. $T_0$ corresponds to the time of occurrence of the leading edge of the control current pulse. The time required for the current from the source to steer into the desired path is $T_1$–$T_0$.

It has previously been suggested that inductive switches rather than cryotrons be employed in the respective paths of a switching tree. In an inductive switch, the control electrode is formed of a soft superconductor such as tin and the gate electrode is formed of a hard superconductor such as lead. A control current (or magnetic or other field) is applied to the control electrodes of the inductive switches in all except a desired path through the switching tree. This current switches all of the control electrodes out of the superconducting state. When the control electrode is switched out of the superconducting state, the gas electrode associated therewith sees a relatively large value of inductance because of the removal of the magnetic field shielding effect of the control electrode. Accordingly, when inductive switches are employed in a switching tree, all paths except the desired one exhibit a substantial value of inductance and the desired path exhibits a relatively low value of inductance. The result is that the current available for steering "instantaneously" steers into the desired (low inductance) path.

While the inductive switch discussed above is very rapid, it does have disadvantages in certain applications, as, for example, when the loads associated with the switching tree are resistive loads. While the initial distribution of current among the paths is "instantaneous," the current later redistributes among the paths in inverse proportion to the resistance in each path. This is shown by curve 12 in FIG. 2. It is assumed that the control current pulse applied to the various control electrodes has a very steep leading edge. The current available for steering "instantaneously" steers into the desired path as indicated at 14, 16. However, shortly thereafter the current decays and redistributes among the various paths in accordance with the load resistances present in the various paths, as indicated at 16, 18.

The circuit of the present invention has the advantages both of the cryotron and of the inductive switch. The circuit includes control element means, shown as planes 20 and 22 in FIG. 1, and a gate element, shown as plane 24 in the same figure. While in the cryotron the control element is formed of a hard superconductor and the gate element is formed of a soft superconductor, and in the inductive switch the control element is formed of a soft superconductor and the gate element is formed of a hard superconductor, here both the control and gate elements are formed of soft superconductors.

Figure 1:
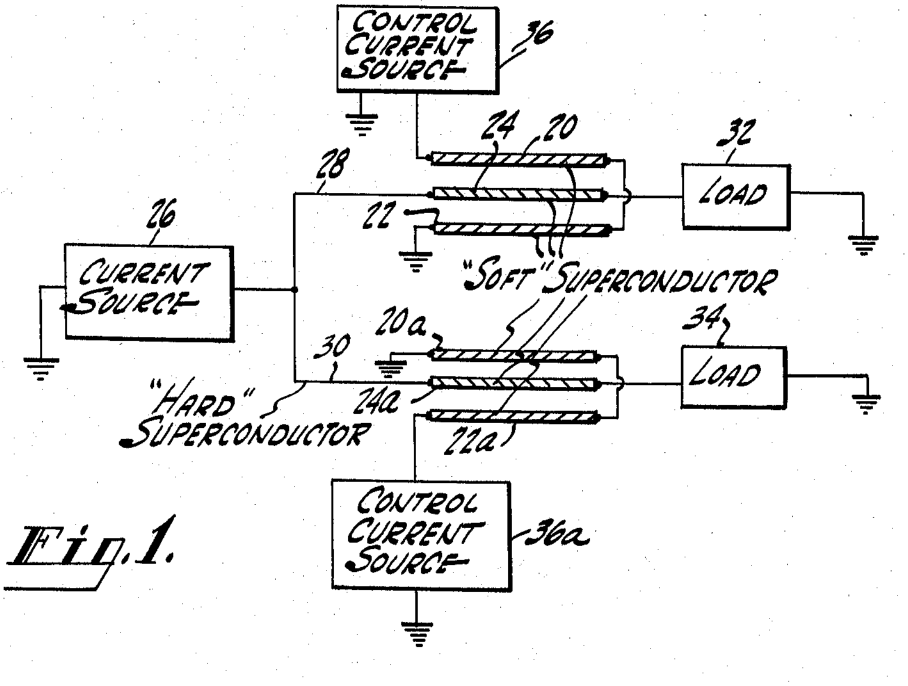
FIG. 1 is a block and schematic circuit diagram, partially in cross-section of a current steering circuit embodying the invention.

The switching circuit shown in FIG. 1 is a simple switching tree having only two paths. It is to be understood that the invention may be embodied in much larger trees. A current source 26, which may be a pulse source, supplies a current both to paths 28 and 30. The gate element 24 is in series with path 28 and the gate element 24*a* is in series with path 30. The paths 28 and 30 also include loads shown at 32 and 34, respectively. The control elements 20, 22 are connected to a control current source 36 and the control elements 20*a* and 22*a* are connected to a control current source 36*a*.

In the operation of the circuit of FIG. 1, assume that the control current source 36 is inactive and the control current source 36*a* is active. In its active condition, the source 36*a* applies a current to the control elements 22*a*, 20*a* of sufficient magnitude to switch these control elements from their superconducting to their normal (resistive) state. Further, the magnetic field produced by the control elements 22*a*, 20*a*, which is concentrated in the space between the elements, is of sufficient magnitude to drive gate electrode 24*a* to its normal condition.

If now a current pulse is applied by source 26 to the two paths 28 and 30, path 28 appears to have a very low value of inductance in view of the shielding effect of the superconducting control elements 22 and 20. Path 30, on the other hand, appears to have a relatively high value of inductance, as the superconducting shield (elements 20*a,* 24*a*) for the gate electrode 24*a* has been switched to the normal state. Accordingly, the current from source 26 instantaneously steers into path 28, as indicated at 14, 16 in FIG. 2. In addition, the control electrode 24*a* is in the normal (resistive) condition. Therefore, even if the loads 32 and 34 are resistive and if current from source 26 tends to redistribute from the peak value 16, more of the current continues to flow into path 28 than into path 30. The point is that the total resistance in path 30 (assuming the loads 34 and 32 to be of equal resistance) is greater than that of the path 28.

In a practical circuit, it is advantageous that the resistance exhibited by the loads such as 32, 34 and so on be substantially smaller than the resistance exhibited by the gate electrode when the latter is in its normal condition. Also, the current supplied by source 26 should be of a magnitude less than that which, by itself, would drive a gate element normal. It is also advantageous, although not essential, that the superconductor material for the gate electrode be somewhat "softer" than the superconductor material for the control electrode.

While the circuit of FIG. 1 will operate with switching elements having only a single control element, the folded-back construction shown is advantageous in at least two respects. First, the folded-back structure causes the magnetic field produced to concentrate in the desired area between the two planes and to cancel in the area beyond the two planes. Second, this configuration reduces the self-inductance exhibited by the control elements and thereby speeds up the circuit operation.

Figure 3:
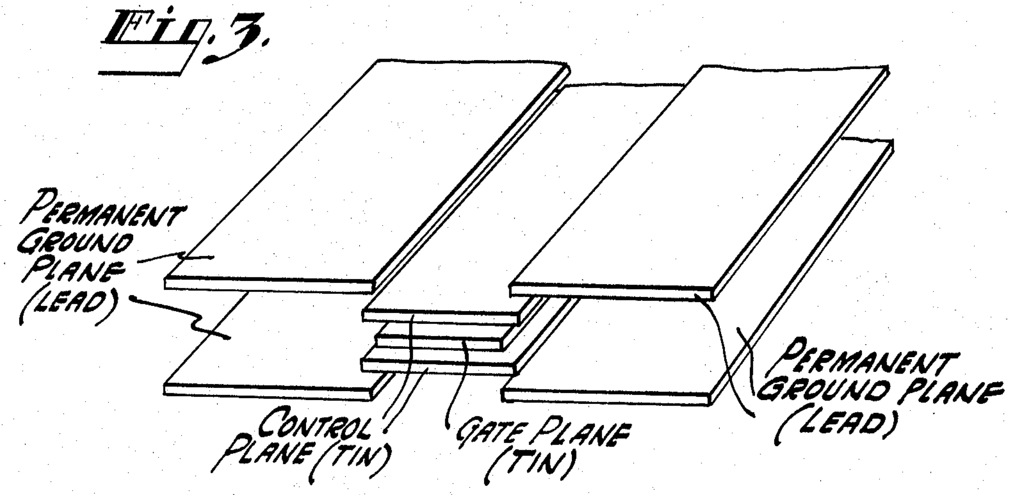
FIG. 3 is a schematic perspective showing of the switching circuit of the invention.

FIG. 3 is a schematic, perspective showing of a switching circuit according to the invention. The various planes shown are preferably in the form of thin films which are insulated from one another by a material such as silicon monoxide. For the purpose of simplicity, the insulation is not shown. It has been found that the overlapped construction shown, that is, the extension of the permanent ground plane slightly over the edges of the control planes and the extension of the control planes over the edges of the gate plane gives improved performance.

In the embodiments of the invention discussed above, the control element is driven between superconducting and normal states. It is also possible to operate the circuit by driving the control electrode to the intermediate state. This may be done by placing a "resistor" of relatively low value (such as one formed of silver or copper) in shunt with the control electrode and applying a current to the control electrode of a magnitude slightly greater than the "critical current," where critical current is defined as the value of current above which an element switches from the superconducting to the intermediate state.

Figure 4:
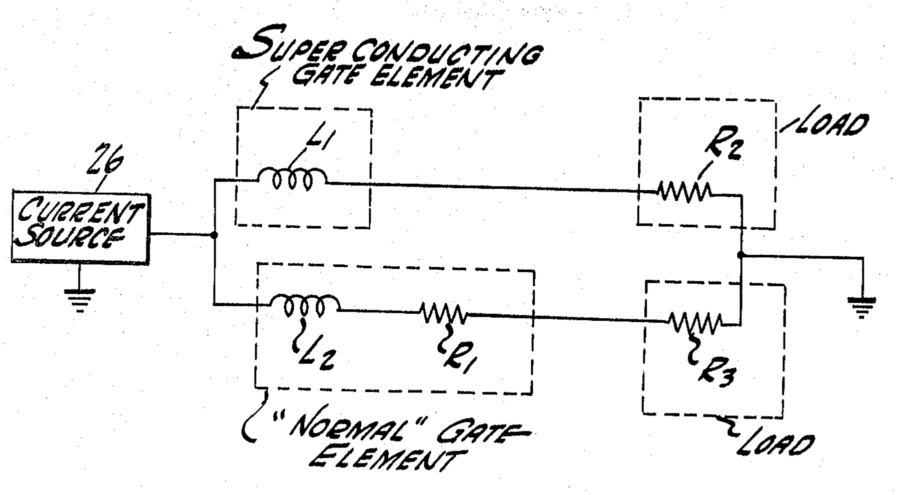
FIG. 4 is an equivalent circuit of one form of circuit of FIG. 1.

FIG. 4 is an equivalent circuit of the arrangement of FIG. 1 in which the two loads 32 and 34 are shown as resistors of values $R_2$ and $R_3$. $L_2$ and $R_1$ are the inductance and resistance, respectively, of the gate electrode which is in the resistive condition. $L_1$ is the inductance of the gate electrode which is in the superconducting condition.

The value of the inductance $L_1$ is much lower than the $L_2$. The ratio may be 1:100, for example. The resistance $R_1$ may be some value such as an ohm or so. By appropriately choosing the values $R_2$ and $R_3$, the time constants in the two branches shown can be made substantially equal. For example, if $R_2$ is made equal to $R_3$ which is made equal to 0.01 ohm then the time constant of the upper branch $$\left(L_{1/R_2}=\frac{L_1}{.01}\right)$$

is substantially equal to that of the lower branch $$\left(\frac{100L_1}{R_3+R_1}=\frac{100L_1}{1+.01}\approx\frac{L_1}{.01}\right)$$

With the values so chosen, if the current pulse from source 26 has a steep leading edge, the current which passes into the branch $L_1$, $R_2$ will salso have a steep leading edge. However, the latter will not overshoot the steady direct current level which the current in this branch eventually assumes. In other words, referring to FIG. 2, the current will rise from point 14 to point 15 and then will follow substantially the dot-dash line 17.

It is also possible in the arrangement of FIG. 4 to control the amount of overshoot (or undershoot). This may be done by adjustment of the relative values of $R_2$ and $R_3$ and in this way adjusting $L/R$ time constants of the respective legs.

What is claimed is:

1. A switching circuit comprising:
a gate electrode formed of a superconductor;
a control electrode immediately adjacent to the gate electrode and formed also of a superconductor; and
means for applying a current to the control electrode of sufficient magnitude to drive both the control and gate electrodes out of the superconducting state.

2. A switching circuit comprising, in combination:
a current path formed of a hard superconductor;
a gate electrode formed of a soft superconductor connected in series with said path;
a control electrode having a first portion on one side of the gate electrode and another portion on the other side of the gate electrode, said control electrode being formed of a soft superconductor and being connected so that a current applied to the control electrode produces a concentrated magnetic field between the two portions of the control electrode; and
means for applying a current to the control electrode of sufficient magnitude to drive both the control and gate electrodes out of the superconducting state.

3. A cryoelectric switching circuit comprising, in combination:
a thin-film gate electrode formed of a soft superconductor;
a thin-film current path formed of a hard superconductor connected in series with said gate electrode;
a thin-film control electrode formed of a soft superconductor, said control electrode comprising two portions, one lying beneath the gate electrode and the other above the gate electrode and said two portions being connected in series; and
means for applying a current to the series connected portions of the control electrode of sufficient magnitude to drive the control and gate electrodes normal.

4. In a cryoelectric switching tree, in combination:
a plurality of current paths, each such path including a gate electrode formed of a soft superconductor;
a plurality of current paths formed of a hard superconductor, each connected in series with a gate electrode;
a plurality of control electrodes formed of a soft superconductor, one for each gate electrode, each located adjacent to its gate electrode;
a plurality of resistive loads, each load connected in series with a different gate electrode, and each load having a value of resistance such that the $L/R$ time constants of the respective paths are substantially equal both when the gate electrodes are in the normal and superconducting states; and
means for selectively applying currents to the respective control electrodes of a magnitude to drive both the control and gate electrodes out of the superconducting state.

References Cited by the Examiner

UNITED STATES PATENTS

| | | | |
|---|---|---|---|
| 2,913,881 | 11/1959 | Garwin | 307—88.5 X |
| 2,989,714 | 6/1961 | Park et al. | 307—88.5 X |
| 3,115,612 | 11/1963 | Meissner | 307—88.5 X |
| 3,171,035 | 2/1965 | Clauser | 307—88.5 |
| 3,191,063 | 6/1965 | Ahrons | 307—88.5 |
| 3,191,160 | 6/1965 | Alphonse | 307—88.5 X |

ARTHUR GAUSS, *Primary Examiner.*

D. D. FORRER, *Assistant Examiner.*